Figure 1:
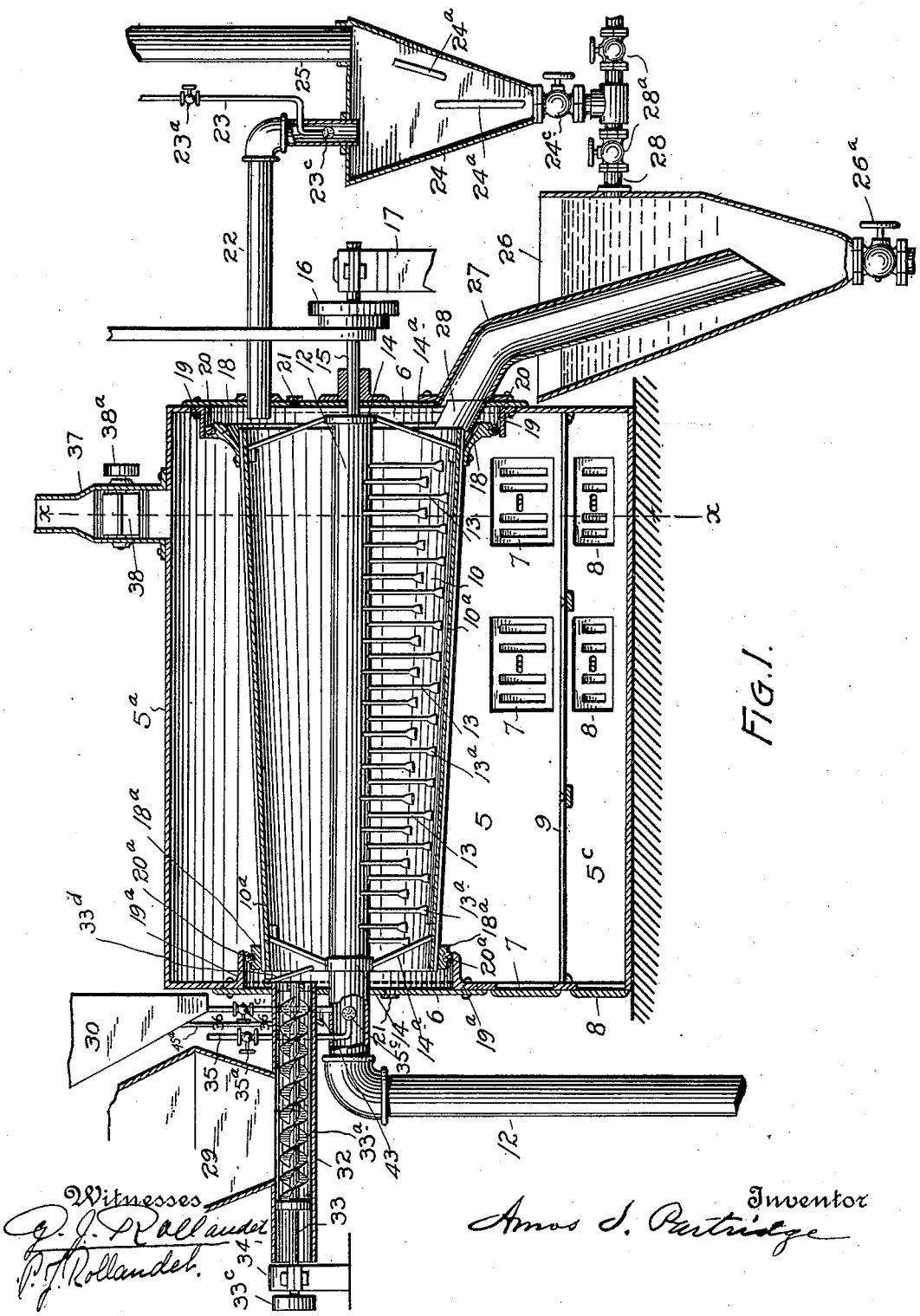

No. 680,613. Patented Aug. 13, 1901.
A. S. PARTRIDGE.
ORE ROASTING AND DESULFURIZING FURNACE.
(Application filed Feb. 18, 1899.)
(No Model.) 2 Sheets—Sheet 1.

Witnesses Inventor
Amos S. Partridge

THE NORRIS PETERS CO., PHOTO-LITHO., WASHINGTON, D. C.

No. 680,613. Patented Aug. 13, 1901.
A. S. PARTRIDGE.
ORE ROASTING AND DESULFURIZING FURNACE.
(Application filed Feb. 18, 1899.)
(No Model.) 2 Sheets—Sheet 2.
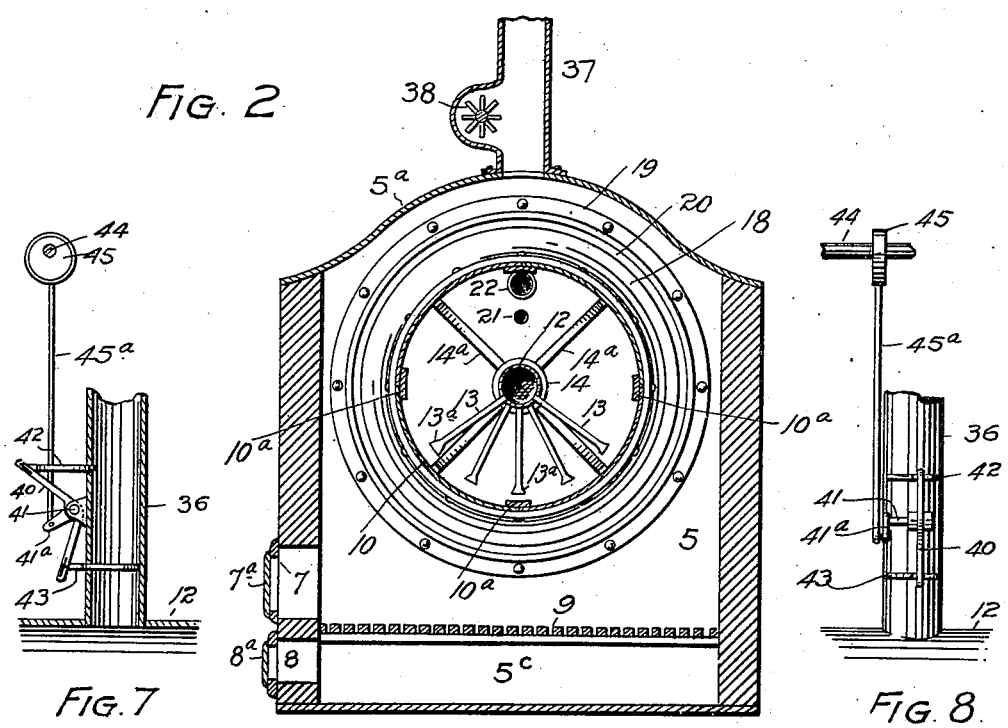
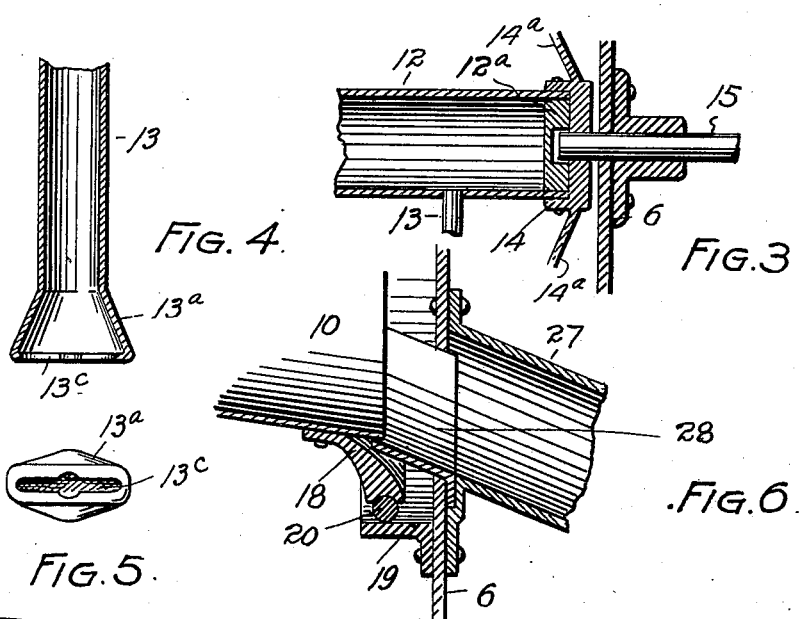

United States Patent Office.

AMOS S. PARTRIDGE, OF ST. LOUIS, MISSOURI.

ORE ROASTING AND DESULFURIZING FURNACE.

SPECIFICATION forming part of Letters Patent No. 680,613, dated August 13, 1901.

Application filed February 18, 1899. Serial No. 706,067. (No model.)

*To all whom it may concern:*

Be it known that I, AMOS S. PARTRIDGE, a citizen of the United States, residing at the city of St. Louis, in the State of Missouri, have invented certain new and useful Improvements in Revolving-Retort Ore Roasting and Desulfurizing Furnaces, of which the following is a full, clear, and exact description, reference being had to the accompanying drawings, forming part of this specification.

It is well known that a proper roasting of ores before submitting them to subsequent treatment liberates and thereby greatly facilitates the extraction and saving of the valuable metals they contain.

My invention relates to an improved apparatus for roasting and desulfurizing ores previously reduced to suitable fineness, by the use of which in the roasting of ores that contain sulfur and other combustible substances the metals therein are liberated by disintegration of the ore in which they are combined and held, thus converting what is known as "refractory" ores into the condition known as "free milling" by destroying the affinity existing between the elements they contain. The higher the degree of heat below the fusing-point of the material under treatment and the greater the regularity and force with which the air is supplied the more evenly the heat is distributed throughout the ore and the more uniformly and rapidly will thorough oxidation occur. It is of primary importance that an oxidizing condition be maintained during the whole time the ore is submitted to the process of roasting, because if the sulfur does not get sufficient oxygen to convert it into sulfurous-acid gas complete oxidation will not be obtained. It has been customary to submit the ores to heat derived from the combustion of fuel mixed with them, which is neither an economical nor efficient practice, because fuel to become effective must be in intimate contact with the air, and when contained in and covered and smothered by the ore only such particles of it as are at the surface and in immediate contact with the air attain perfect combustion.

It is the object of my invention to construct a furnace in which the operations may be so carried out as to realize the desirable results above stated; and my invention consists in devices and features of novelty, in combination with old and well-known methods and devices, as hereinafter fully described, and pointed out in the claims.

While my apparatus relates to the roasting and desulfurizing of ores, it provides for the necessary escape of gases generated by the roasting ore by the old and well-known means of collecting and condensing fumes, smoke, vapors, and gases by contact with water, thereby precipitating and saving the valuable substances contained therein.

Figure 1 is a vertical sectional view taken longitudinally through the center of my improved apparatus. Fig. 2 is a vertical transverse sectional view taken on the line $x\ x$, Fig. 1. Fig. 3 is an enlarged sectional view of one end of the air-pipe and intimate parts. Fig. 4 is a sectional side view of the blowpipe. Fig. 5 is an end view of one of the blowpipes. Fig. 6 is an enlarged sectional view of the discharge end of the retort-shell and intimate parts. Fig. 7 is a sectional view of the pulverized-fuel feed-pipe and of the alternating valves in same and the mechanism for operating them. Fig. 8 is a front view of the fuel-feed pipe and its valves.

The furnace is constructed with suitable side and end walls and a top $5^a$, that inclose a fire-chamber 5, containing an ash-pit $5^c$ and a grate 9.

7 designates doorways for the insertion of fuel onto the grate, the doorways being closed by the doors $7^a$.

10 designates the horizontally-disposed hollow cylindrical revolving retort of conical shape, mounted in the fire-chamber 5 in close relation to the ends 6, provided on its interior with longitudinally-arranged agitating-strips $10^a$. The conical shape of the shell when in operation will move the ore by its own gravity from its feeding-in end to the place of discharge.

In the construction and operation of my furnace I provide for a continuous and ample supply of compressed air to the roasting ore by means of an air-compressor and the air-pipe 12, delivered through the blowpipes 13, in intimate contact with the ore undergoing treatment, in such volume and force as to penetrate and thoroughly permeate the mass of ore and reach every particle of the same, whereby quick perfect combustion and uniform oxidation is obtained. I also provide for a constant and regular supply of quickly-igniting fuel from the fuel-hopper 30 and the valved pipe 36 through the air-pipe 12 and the blowpipes 13, intermixed with and conveyed by the air into the mass of ore whenever the ore under treatment contains less combustible matter than is sufficient to properly oxidize the same with desired rapidity. The fuel thus used may be pulverized charcoal or any other finely-pulverized carbonaceous substance that may be readily conveyed through the air-conveying pipe 12 and blowpipes 13.

In a furnace of the character to which my invention relates it is of much importance that means be provided to prevent the escape of disagreeable or noxious fumes or odors in the operation of the furnace. This is especially the case where arsenical or mercurial ores are being treated, the vapors, smoke, and gases from which are extremely injurious to the operators. For the purpose of preventing the escape of such fumes I effectually close the ends of the revolving retort 10, the closing means comprising angular flanges 19 and $19^a$ of suitable width and pitch to provide for the expansion and contraction of the metallic retort projecting inwardly from the end walls of the furnace, annular grooved wings 18 and $18^a$, carried by the retort and arranged coincident with the flanges 19 and $19^a$, and between the flanges 19 and $19^a$ and the annular grooved wings 18 and $18^a$ I interpose packing-rings 20 and $20^a$, laid in the grooves. The packing-rings must be sufficiently flexible to adjust themselves to and fill the varying space between the flanges and the annular rings and may be made over a coil of spring-wire overlayed with any suitable incombustible plastic non-conductor of heat to prevent untempering the spring-wire, or they may be made wholly of any pliable incombustible material—such, for instance, as asbestos—and may be kept lubricated by the application of plumbago, mica, or other incombustible lubricant. By suitable pitch and width of the flanges 19 and $19^a$ the grooved annular wings 18 and $18^a$, so adjusted as to hold the packing-rings 20 and $20^a$ in place, I provide for the expansion and contraction of the metallic shell of the retort and coexisting parts, thus preventing the escape of injurious fumes and gases to be inhaled by the operators. The fumes pass from the retort 10 into a pipe 22, that leads to a fume-precipitation tank 24, in which they are condensed and relieved of all particles of value, after which they are conveyed through the outlet-pipe 25 to the atmosphere or any place desired. The precipitation-tank 24 contains baffle-partitions $24^a$. In order to facilitate the precipitation of the metallic particles carried by the fumes to the pipe 22, I employ a pipe 23, provided with a valve $23^a$, and a sprayer $23^c$, located within the pipe 22, through which water may be injected to cause the more ready precipitation of the metallic particles. Leading from the fume-precipitation tank 24 is a valved pipe $24^c$, that leads to a pipe 28, provided with valves $28^a$, and is connected to the main precipitation-tank 26, and through which the precipitates may be conveyed wherever desired. The retort-shell $10^d$ has connected to it at its ends supporting-spiders 14 and $14^a$, the hubs of which encircle the air-pipe 12, and connected to one of the spiders is a shaft 15, provided with a pulley 16, that receives a belt by which the retort is driven.

26 designates the main ore-receiving tank, containing water or other aqueous liquid, provided with the outlet-valve $26^a$, and 27 is a discharge-pipe leading into said main ore-receiving tank and connected to one of the end plates 6.

28 is a chute secured to the end plate 6 and discharge-pipe 27 and having its inner end arranged beneath the outlet end of the revolving retort-shell $10^d$, where it receives the material from the retort and delivers it desulfurized into the discharge-pipe 27. The lower end of the discharge-pipe 27 is always maintained sufficiently beneath the surface of the liquid in the main precipitation-tank to prevent the escape of fumes through said pipe, thus compelling such fumes to pass to and through the escape-pipe 22.

29 designates the ore-receiving hopper open to communication with the conveyer-tube 32, containing a conveyer-screw 33 $33^a$, provided with a driving-pulley $33^c$ or other means of transmitting power mounted in a bearing 34. The conveyer-tube 32 is open at its inner end to communication to the retort, so that the ore being of suitable fineness may be freely fed into the retort; but when the ore is not being fed by the conveyer the inner end of the conveyer-pipe is closed by a gravity-check $32^a$ to prevent the escape of air or gas from the retort through the conveyer-tube.

30 designates a pulverized-fuel-receiving tank connected to the air-pipe 12 by a pipe 36, containing valves 42 and 43. The valves 42 and 43 (see Figs. 7 and 8) have connected to them a bell-crank 40, mounted on a shaft 41, provided with a crank-arm $41^a$, that receives the connection of a rod $45^a$, that leads to an eccentric 45 on a shaft 44, that may be suitably operated to alternately open and close the valves 42 43 and deliver a given quantity of pulverized fuel through the pipe 36 to the air-pipe on the movement of the connecting-rod $45^a$.

37 designates the smoke-stack, which may contain a draft-fan 38, adapted to be driven by power applied to a drive-pulley $38^a$.

When the plant is installed to prepare the apparatus for roasting, a fire is started in the fire-chamber 5 and the revolving retort put in motion until it assumes a low cherry-red color, when the compressed air and feed-screw should be put in operation.

The parts of my said improved apparatus the discovery or invention of which I claim consist in the construction and use in such a furnace, substantially as described, of the air-pipe 12, the blowpipes 13, the supporting-spiders 14 and 14ª, the shaft 15 and its attachments, whereby the retort-shell is made to revolve, the annular wings 18 and 18ª, the angular flanges 19 and 19ª, and the flexible packing-rings 20 and 20ª, the ore-discharge pipe 27 in connection with the chute 28, whereby the desulfurized ore is automatically discharged by its own gravity, the dry-pulverized-fuel tank 30, connected to the air-pipe 12 by pipe 36, the alternating valves 42 and 43, and means for operating the same. All other parts, devices, modes, and mechanisms employed in the construction of my said furnace are old and well known, no invention *per se* being herein claimed for such parts, they being designed for service in supporting the parts to which my invention does relate.

I claim as my invention—

1. In a furnace of the character described, the combination of a revoluble retort having open ends adjacent to the end walls of the furnace, a packing between the end walls and retort, an air-conducting pipe within the retort, blowpipes projecting from and having communication with the interior of said pipe, spiders carried by said retort and rotatably mounted on said air-pipe, means for rotating said retort, and means for feeding ore into the retort.

2. In a furnace of the character described, the combination with the end walls of the furnace, of flanges projecting inwardly therefrom, a revoluble conical retort, annular wings carried by said retort and positioned within said flanges, packing-rings arranged between said flanges and wings, and a chute located at the discharge end of said retort, substantially as described.

3. In a furnace of the character described, the combination with the furnace-walls, of a revoluble retort, retort-supporting flanges projecting inwardly from the walls of the furnace, annular wings surrounding said retort and positioned within said flanges, packing-rings between said flanges and wings, a discharge-pipe leading from the wall of the furnace at the discharge end of said retort, and a chute providing a slideway from the discharge end of the retort to said spout, substantially as described.

In witness whereof I hereunto sign my name in the presence of two witnesses.

AMOS S. PARTRIDGE.

Witnesses:
JOHN EDWARD ROBINSON,
LOUIS ANFENGER.